United States Patent [19]

Yoldas et al.

[11] Patent Number: 4,474,429
[45] Date of Patent: Oct. 2, 1984

[54] AFFIXING AN OPTICAL FIBER TO AN OPTICAL DEVICE

[75] Inventors: Bulent E. Yoldas, Churchill; Eugene G. Vaerewyck, Pittsburgh, both of Pa.

[73] Assignee: Westinghouse Electric Corp., Pittsburgh, Pa.

[21] Appl. No.: 354,867

[22] Filed: Mar. 4, 1982

[51] Int. Cl.³ ............................................. G02B 7/26
[52] U.S. Cl. ..................................... 350/320; 65/4.1; 350/96.17; 350/96.20
[58] Field of Search ............... 350/96.12, 96.13, 96.14, 350/96.15, 96.17, 96.20, 320; 356/351; 156/637, 643; 65/4.1, 4.3, 4.21, 43

[56] References Cited

U.S. PATENT DOCUMENTS

| 3,548,189 | 12/1970 | Meinel et al. | 156/643 X |
| 4,273,445 | 6/1981 | Thompson et al. | 350/96.17 X |
| 4,340,272 | 7/1982 | Papuchon et al. | 350/96.14 |
| 4,370,192 | 1/1983 | Cooley | 156/637 X |

FOREIGN PATENT DOCUMENTS

| 0021353 | 2/1979 | Japan | 350/96.15 |
| 0004021 | 1/1980 | Japan | 350/96.15 |

Primary Examiner—John D. Lee
Assistant Examiner—Akm E. Ullah
Attorney, Agent, or Firm—J. B. Hinson

[57] ABSTRACT

The invention comprises a method for coupling an optical fiber to an optical device. Ends of optical fibers are ion polished. Micro-manipulators are used to position the polished end in abutting relationship with the optical device. A liquid which contains glass constituents is used to coat the junction of the optical fiber and the optical device. The liquid is subjected to a temperature cycle which fuses the glass constituents to the optical fiber and to the optical device.

9 Claims, 6 Drawing Figures

IONIZED ARGON STREAM

AFFIXING AN OPTICAL FIBER TO AN OPTICAL DEVICE

CROSS-REFERENCE TO RELATED APPLICATIONS

An optical waveguide interferometer system using optical waveguides is described in a U.S. patent application filed by Nasuta et al., Ser. No. 276,767 and assigned to the same assignee as this application.

BACKGROUND OF THE INVENTION

1. Field of the Invention:

The invention relates to optical systems and more specifically to improved methods or coupling optical fibers to optical waveguides.

2. Description of the Prior Art:

Optical fibers and optical transmission lines are well known in the prior art. Prior art efforts to butt couple optical fibers to optical waveguides have resulted in high losses due to the optical and mechanical characteristics of the interface between the optical fiber and the optical transmission line. These losses are attributable to two primary mechanisms, these being the mismatch of the index of refraction between the optical fiber and the optical waveguide, and the misalignment between the optical fiber and the waveguide. Optical and mechanical problems related to coupling optical fibers to optical waveguides are substantially reduced by the disclosed coupling devices and methods in which the suitable glass is applied from liquid precursors at room temperatures which is later fused to form a solid glass region at relatively low temperatures.

SUMMARY OF THE INVENTION

The invention comprises a device and method for efficiently coupling light into and out of optical devices such as optical waveguides. The preferred embodiment of the invention utilizes an improved process for affixing single mode optical fibers to optical devices, such as optical waveguides. In practicing the process, a single mode optical fiber is tapered, coated with a thin layer of metal and the end polished. Micro manipulators are used to position the polished end of the single mode optical fiber in abutting relationship with the optical device to which it is to be affixed. A liquid containing glass precursors is applied at room temperature to the junction of the single mode optical fiber and the optical device at ambient temperature (room temperature) and subjected to a temperature cycle which causes glass to form and fuse to the polished end of the optical fiber and the optical device.

DETAILED DESCRIPTION

Figure 1:
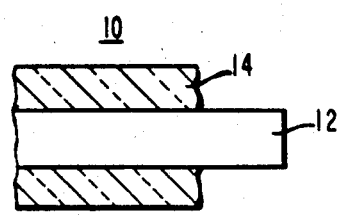
FIG. 1 is a cross section of a segment of a single mode fiber.

FIG. 1 is a cross section drawing of a portion of a single mode optical fiber 10. As is conventional, the optical fiber 10 includes a core 12 having a diameter in the general range of 6 microns. A cladding 14 surrounds and is affixed to the core 12 and has a diameter in the general range of 90 microns. Optical fiber 10 is a typical single mode optical fiber of the type utilized in the invention. Typically, single mode optical fiber 10 is composed of lead-borosilicate glass and has a thermal expansion coefficient less than $10 \times 10^{-6}/°C$.

Figure 2:
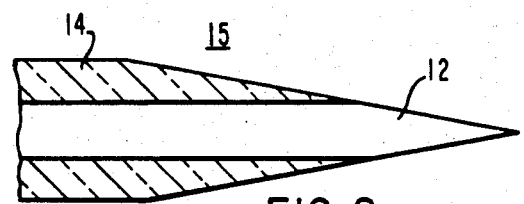
FIG. 2 is a cross section of a single mode optical fiber after tapering in accordance with the process described in this application.

In preparing the optical fiber 10 for use in accordance with the invention, the optical fiber 10 is first cut so that the core 12 is substantially flat with respect to the cladding 14. A cone-shaped section 15 as illustrated in FIG. 2 is then formed at the end of the optical fiber 10 by uniformly tapering (in accordance with a process subsequently discussed) the optical fiber 10 with the length of the cone-shaped section 15 generally being in the neighborhood of one inch.

Figure 3:
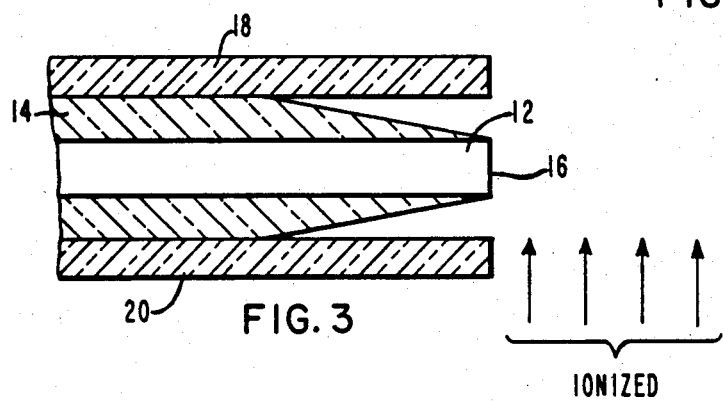
FIG. 3 is a diagram illustrating the polishing of the end of the core of a single mode optical fiber.

Before the cone-shaped section 15 can be utilized in accordance with the invention, it is necessary to remove the pointed end portion of the core 12 to form a flat and polished end, generally illustrated as reference numeral 16 in FIG. 3. As will be appreciated by those skilled in the art, the single mode optical fiber 10 is extremely fragile in that it is typically glass and has a diameter typically in the neighborhood of 90 microns, as discussed above. The fragility of the optical fiber 10 is increased by the tapered portion. This being the case, polishing the end of portion 16 of the core 12 is a delicate process.

Functionally, this polishing can be accomplished by positioning the cone-shaped section 15 between first and second plates 18 and 20, preferably made of glass, such that the end of the cladding 14 terminates at approximately the edge of the glass plates, 18 and 20. A stream of ionized gas, for example argon, is then directed (using conventional techniques) perpendicular to the optical axis of the exposed portions of the core 12. This effectively removes the pointed end portion of the core 12 and produces a polished end portion 16 as illustrated in FIG. 3.

Figure 4:
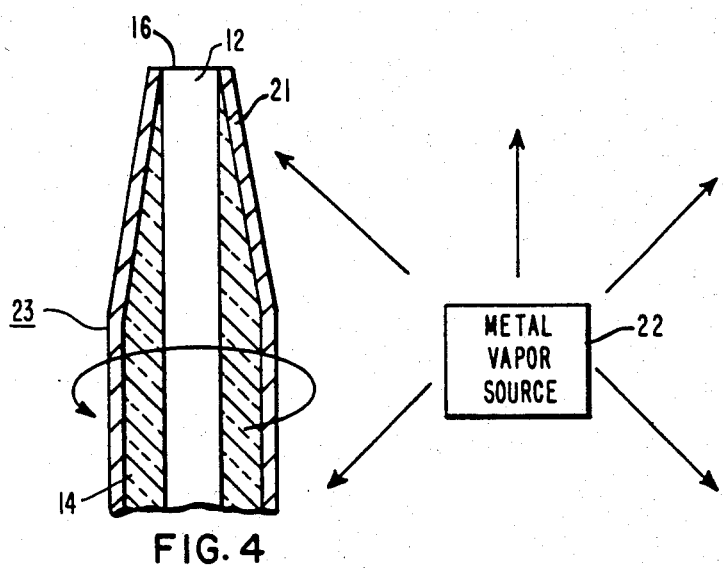
FIG. 4 is a diagram illustrating the process for coating a tapered portion of the cladding of a single mode optical fiber with a metal layer.

Following removal of and polishing of the end portion 16 of the core 12, the tapered portion of the cladding 14 is coated with a thin metal layer 21, utilizing a process functionally illustrated in FIG. 4, to form a cone-shaped coupling section 23. In forming the metal layer 21 the optical fiber is positioned vertically with the polished end 16 higher than the metal vapor source 22. A conventional metal vapor source 22, for example, a vapor source of the type used to deposit aluminum layers in the semiconductor art is usable in the illustrated process. The cone-shaped section is then rotated with respect to the metal vapor source 22 for a sufficient time period to deposit a thin metal layer 21 of aluminum (for example) on the outer surface of the cone-shaped cladding section 14. This layer eliminates the light escaping through the outer surface of the cone-shaped section.

A process for conveniently tapering the optical fibers is essential in forming the metal coated cone-shaped coupling section 23 described above. Typical single mode optical fibers are composed of glass and the tapered sections can be conveniently formed by an etching process using hydrofluoric acid. This process is illustrated in FIG. 5.

Functionally, a container 24 having therein a suitable amount of hydrofluoric acid 25 is supported on a suitable flat surface 26. Suspended above the surface of the hydrofluoric acid 25 is a circular disc-like member 28 suspended by a cable 30 near its center. The flat surface of the disc-shaped member 28 contains a series of openings through which single mode optical fibers 32, 34, 36 and 38 pass. Disc member 28 can conveniently be made of nylon or teflon with the openings having a diameter which permits the single mode optical fibers 32, 34, 36 and 38 to be passed through but have sufficient friction to retain the optical fibers 32, 34, 36 and 38 in the desired position.

Figure 5:
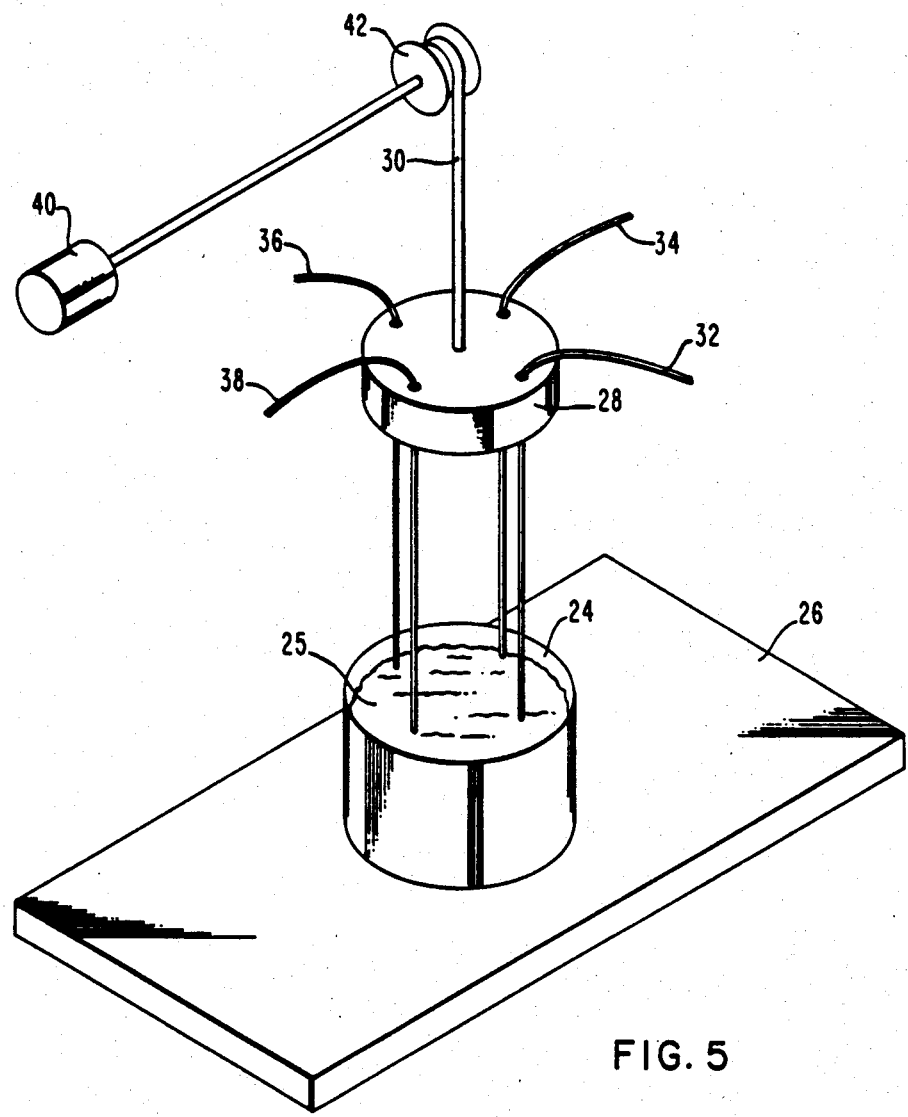
FIG. 5 is a diagram illustrating the process for tapering single mode optical fibers.

After the optical fibers 34, 36 and 38 have been positioned as shown in FIG. 5, an electrical motor 40 is energized to rotate a pulley 42 such that the optical fibers 32, 34, 36 and 38 are withdrawn from the hydrofluoric acid 25 at a constant rate.

The etching rate of the optical fibers 32, 34, 36 and 38 is affected by the concentration of the hydrofluoric acid 25 as well as the temperature. The length of the tapered section is, of course, determined by the etching rate and the rate at which the optical fibers are withdrawn from the hydrofluoric acid 25. In practice, the temperature, the acid concentration and the withdrawal rate are selected to give the desired length for the tapered section. Currently it is believed that the most desirable length for the tapered section is in the general neighborhood of one inch.

Although the etching process is illustrated in FIG. 5 using four optical fibers 32, 34, 36 and 38, more or less optical fibers may be used.

Figure 6:
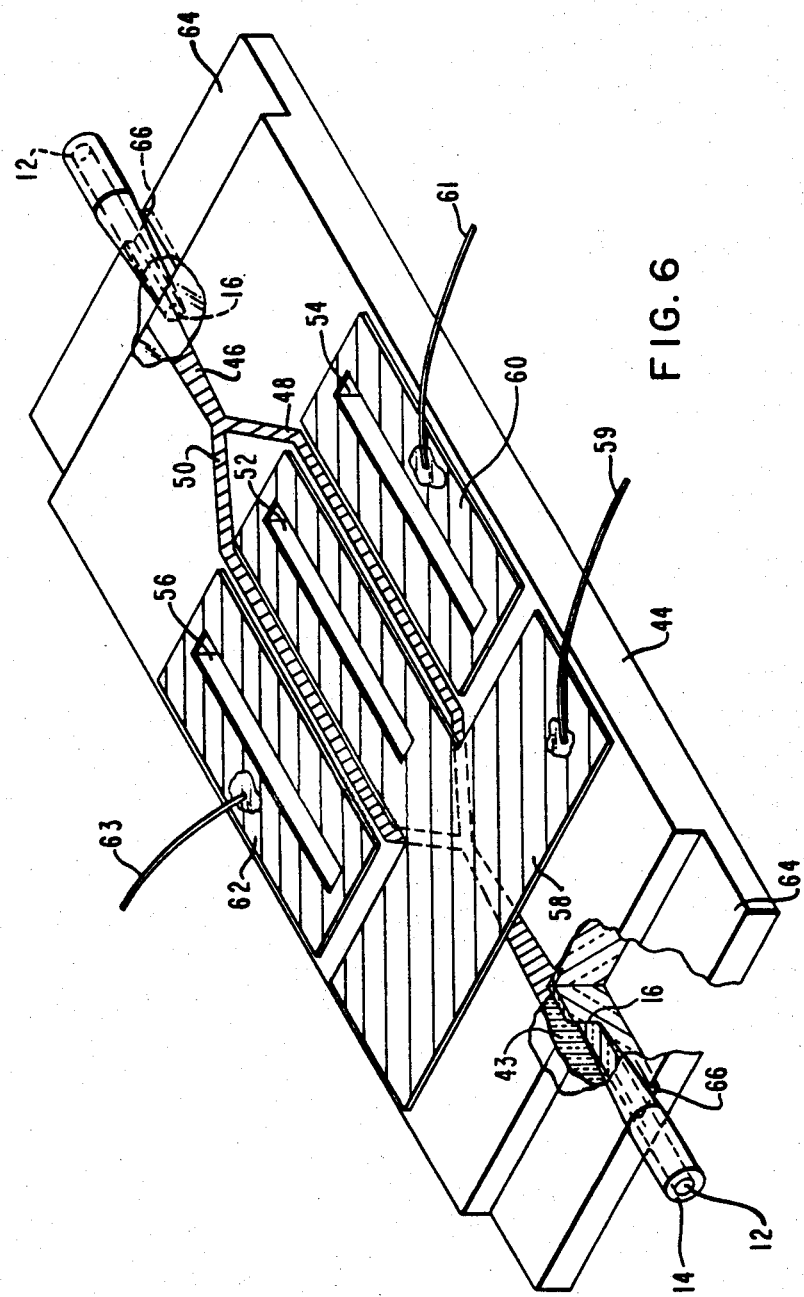
FIG. 6 is a diagram of an optical interferometer system.

FIG. 6 is a diagram of an interferometer system utilizing the cone-shaped fiber optic coupling devices of the type discussed above. The interferometer system utilizes an optical waveguide interferometer formed in a lithium niobate substrate 44. Lithium niobate has a thermal expansion coefficient ranging from $2 \times 10^{-6}/°C$. to $16.7 \times 10^{-6}/°C$., depending on the crystal axis.

An optical waveguide 46 formed in the upper surface of the lithium niobate 44 is made by diffusing titanium into the lithium niobate substrate 44. Near the center of the interferometer, the optical waveguide 46 is divided into two branches 48 and 50 which include central portions which are substantially parallel. A first groove 52 is etched in the upper surface of the lithium niobate substrate 44 in an area between the substantially parallel portions of the optical waveguide 46. Second and third grooves, 54 and 56, are also etched in the upper surface of the lithium niobate substrate 44 adjacent the substantially parallel portions of the two branches 48 and 50 of the optical waveguide 46. Generally, these grooves penetrate the lithium niobate substrate 44 to a depth that substantially equals or is in excess of the depth of the optical waveguide 46. Functionally, these grooves reduce cross coupling between the substantially parallel portions of the branches 48 and 50 of the optical waveguide 46 and reduce transmission of light into the lithium niobate substrate along the outer edges of the substantially parallel portions of the optical waveguide 46. This substantially improves the operation of the interferometer.

A first metallic electrode 58 is affixed to the upper surface of the lithium niobate substrate 44 and extends over the area between the substantially parallel portions of the branches 48 and 50 of the optical waveguide 46. Second and third electrodes, 60 and 62, are similarly affixed to the lithium niobate substrate 44 adjacent to the substantially parallel portions of the branches 48 and 50 of the optical waveguide 46. These electrodes are utilized to selectively subject the parallel portions of the branches 48 and 50 of the optical waveguide 46 to a differential electric field. This differential electric field can be conveniently established by coupling a first voltage source between electrodes 58 and 60 utilizing leads 59 and 61 respectfully affixed thereto; and a second voltage source between electrodes 58 and 62 utilizing leads 59 and 63. Since the velocity of light propagation through the diffused waveguides formed in the lithium niobate substrate 44 is a function of the electric field to which they are subjected, this arrangement permits the velocity of light in one of the parallel sections of the branches 48 and 50 of the optical waveguide 46 to be increased while the other one is decreased. Alternatively, the velocity in one path could be maintained constant and the velocity in the other path modified. This permits intensification or attenuation of the transmitted light at the point where the substantially parallel portions of the optical waveguide join and form a single waveguide 46.

From inspection it is obvious that the optical interferometer illustrated in FIG. 6 is symmetrical and bidirectional. That is, light can be transmitted in either direction with equal efficiency and there is essentially no structural difference between the optical input and output of the interferometer. For this reason the same reference numbers will be utilized to identify the same structural features at both ends of the interferometer.

Coupling is provided to the ends of the optical waveguide 46 by cone-shaped coupled sections 15 of the type illustrated in FIG. 4. The efficiency of light transmission through the optical waveguide 46 is a function of the crystal axis of the lithium niobate substrate 44 relative to the optical waveguide 46. A crystal axis is selected for the lithium niobate substrate 44 to provide the best match between the coefficient of thermal expansion of the lithium niobate substrate and the optical fiber and the efficiency of light transmission through the optical waveguide 46.

The lithium niobate substrate 44 has small shelf-like portions 64 etched in the upper surface at each end. Additionally the shelf portions 64 include small grooves 66 which aid in positioning the cone-shaped coupling sections 15 in abutting relationship with the ends of the optical waveguide 46. Structurally the shelf-portions 64 have a depth approximating the diameter of the core portion of the optical fiber. The depth of the groove 66 is small as compared to the shelf portion 64. In assembling the interferometer system, micro-manipulators of a conventional type are utilized to position the polished end sections 16 in abutting relationship with the exposed ends of the optical waveguide 46. A small amount of liquid which contains precursor of the glass constituents is applied on the junction of the optical fiber 10 and the ends of the optical waveguide 46. The liquid flows around the cone-shaped coupling sections and between the ends of the optical waveguide 46 and the polished ends of 16 and the core 12 depositing a coating. The coating and the interferometer are subjected to a temperature cycle which causes the liquid to pyrolise to a reactive organic free glass which fuses to the optical fiber and the lithium niobate substrate 44 forming a solid glass region 43.

The pyrolised glass has an approximate composition by weight of:

| INGREDIENT | WEIGHT % |
|---|---|
| $SiO_2$ | 35.4 |
| $Al_2O_3$ | 5.4 |
| PbO | 45.9 |
| $B_2O_3$ | 13.0 |

Glass of this formulation has a thermal expansion coefficient in the range of $3.5 \times 10^{-16}$/cm/cm °C. This composition has a thermal expansion coefficient close to the optical fiber and the lithium niobate substrate and the borosilicate cladding of the optical fiber. Additionally, the thermal expansion of the solidified glass can be modified by altering ratios of the constituents.

As previously discussed, the glass is applied in a liquid form from solutions which contains glass constituents in a polymerized form.

This advance in glass formation was accomplished by the use of metal-organic compounds, particularly metal alkoxides. Formation of glass network in these processes takes place through occurrence of the simultaneous reactions, hydrolysis and polymerization. A controlled partial hydrolysis is performed between a suitable metal alkoxide such as $Si(OC_2H_5)_4$ and water, converting some of the alkyl groups, $(C_2H_5)$, into (OH) bonds. The second reaction triggered by the first occurs concurrently between (OR) species of other glass constituents and freshly formed hydroxyl groups:

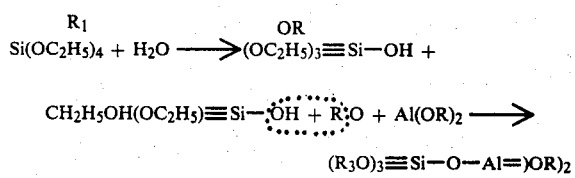

Further hydrolysis and cross polymerization eliminates most of the organic components, creating a soluble polymer with main oxide network.

Since glass constituents are already reacted in this system and chemical reactivity is high, a bake temperature 400°-700° C. liberates remaining organic groups and causes the glass to react and fuse to the optical fiber and the lithium niobate to form a high optical quality glass region having high mechanical integrity. The $CO_2$ and the $H_2O$ escape as a vapor. This method of forming glass is well known in the prior art. An article titled "Preparation of Glasses And Ceramics From Metal-Organic Compounds", Journal of Materials Science, Vol. 12, 1977, pages 1203-1208, describes this process for making a wide class of glasses. Additionally it may be desired to provide a protective environment such as nitrogen to protect the components of the interferometer while it is subjected to elevated temperatures. This can be accomplished using conventional techniques.

The completed optical interferometer system comprises the interferometer described above and the optical fibers affixed thereto to provide convenient input and output coupling.

After the optical interferometer is assembled, as described above, optical energy can be coupled to the single mode optical fibers and taken therefrom using any conventional technique with the amount of light transmitted through the interferometer being modulated by the differential electric field across the two substantially parallel sections of the branches 48 and 50 of the optical waveguide 46.

Although the central section of the branches 48 and 50 of the optical waveguide 46 are shown as two substantially parallel portions, other configurations may be used. Electrodes 58, 60 and 62 may be formed by depositing metal on the substrate 44 using conventional processes. Shelf portion 64, grooves 52, 54, 56 and 66 may be formed by conventional ion milling. Other modifications are also possible. It is also possible that other glass formulations which are liquid at a moderate temperature may be used.

What is claimed is:

1. A method of coupling a single mode optical fiber to an optical waveguide; including the steps of:
   (a) tapering the cladding and core of said single mode optical fiber;
   (b) polishing the end of said core;
   (c) coating the tapered portion of said cladding with an optically opaque layer;
   (d) positioning said polished end of said core in abutting relationship to an end of said optical waveguide;
   (e) coating the junction of said polished end of said optical fiber with said end of said optical waveguide with a liquid including glass constituents, said liquid wetting said polished end and said optical device and substantially filling the area between said polished end and said optical device;
   (f) subjecting said liquid to a temperature cycle which causes said glass constituents to pyrolize and fuse to said polished end of said optical fiber and to said end of said waveguide.

2. A method of coupling a single mode optical fiber to an optical waveguide in accordance with claim 1 wherein said opaque layer is formed by depositing a metal on said tapered portion of said cladding.

3. A method in accordance with claim 2 wherein said glass constituents are substantially derived from metal organic compounds and alkoxides.

4. A method in accordance with claim 3 wherein said glass has an index of refraction selected to increase the optical coupling between said optical fiber and said optical waveguide.

5. A method in accordance with claim 2 wherein the said liquid containing glass constituents is prepared by chemical polymerization of glass constituents.

6. A method in accordance with claim 5 wherein the constituents of said glass are selected to produce a glass having a thermal coefficient of expansion which reduces stresses due to temperature changes.

7. A method in accordance with claim 6 wherein said optical waveguide is formed in a lithium niobate substrate with the crystalline axis of said substrate oriented to reduce stresses in said optical fiber.

8. A method in accordance with claim 7 wherein said lithium niobate substrate is oriented to have its lowest thermal expansion coefficient in a direction parallel to the optical axis of said optical fiber.

9. A method in accordance with claim 8 wherein said liquid is subjected to a temperature in the range of 400° to 700° C. during said temperature cycle.

* * * * *